US012084309B2

(12) United States Patent
Pahlke et al.

(10) Patent No.: US 12,084,309 B2
(45) Date of Patent: Sep. 10, 2024

(54) WIRELESS CONNECTIVITY IN AN ELEVATOR SYSTEM

(71) Applicant: Otis Elevator Company, Farmington, CT (US)

(72) Inventors: Derk Pahlke, Berlin (DE); Mario Pink, Berlin (DE)

(73) Assignee: OTIS ELEVATOR COMPANY, Farmington, CT (US)

(*) Notice: Subject to any disclaimer, the term of this patent is extended or adjusted under 35 U.S.C. 154(b) by 1483 days.

(21) Appl. No.: 16/447,329

(22) Filed: Jun. 20, 2019

(65) Prior Publication Data
US 2019/0389690 A1 Dec. 26, 2019

(30) Foreign Application Priority Data

Jun. 25, 2018 (EP) ..................... 18179571

(51) Int. Cl.
*B66B 1/34* (2006.01)
*B66B 1/24* (2006.01)
*B66B 1/28* (2006.01)
*B66B 1/46* (2006.01)
*H04W 84/12* (2009.01)

(52) U.S. Cl.
CPC .......... *B66B 1/3453* (2013.01); *B66B 1/2408* (2013.01); *B66B 1/28* (2013.01); *B66B 1/3461* (2013.01); *B66B 1/468* (2013.01); *B66B 2201/101* (2013.01); *B66B 2201/103* (2013.01); *B66B 2201/303* (2013.01); *B66B 2201/4615* (2013.01); *B66B 2201/4653* (2013.01); *H04W 84/12* (2013.01)

(58) Field of Classification Search
None
See application file for complete search history.

(56) References Cited

U.S. PATENT DOCUMENTS

| 7,720,040 | B2 | 5/2010 | O'Neil |
| 8,014,718 | B2 | 9/2011 | Bassiri et al. |
| 8,068,836 | B2 | 11/2011 | Voyer et al. |
| 9,173,172 | B2 | 10/2015 | Shinada et al. |

(Continued)

FOREIGN PATENT DOCUMENTS

| CN | 1549462 B | 5/2010 |
| CN | 202663399 U | 1/2013 |

(Continued)

OTHER PUBLICATIONS

European Search Report for application 18179571.7, Jan. 4, 2019, 7 pages.

(Continued)

*Primary Examiner* — Lennin R Rodriguezgonzalez
(74) *Attorney, Agent, or Firm* — CANTOR COLBURN LLP

(57) ABSTRACT

The invention relates to a method of providing a seamless wireless connection in an elevator system of a building. The method comprises receiving an elevator car request from a passenger who is on a source floor, dispatching an elevator car to the source floor in response to the elevator car request, selecting at least one wireless local area network (WLAN) established in the building, and forwarding the selected at least one WLAN via a network node placed in at least one of an elevator hall of the source floor, the dispatched elevator car, or an elevator hall of a destination floor.

15 Claims, 5 Drawing Sheets

(56) References Cited

U.S. PATENT DOCUMENTS

| | | |
|---|---|---|
| 9,736,699 B1 | 8/2017 | Rao |
| 2014/0045479 A1 | 2/2014 | Shinada et al. |
| 2016/0031676 A1 | 2/2016 | Haipus |
| 2017/0057781 A1 | 3/2017 | Depaola |
| 2017/0174471 A1 | 6/2017 | Salmikuukka et al. |

FOREIGN PATENT DOCUMENTS

| | | |
|---|---|---|
| CN | 105827823 A | 8/2016 |
| JP | 4332595 B1 | 9/2009 |
| WO | 2017216413 A1 | 12/2017 |

OTHER PUBLICATIONS

Geier, Jim, "How to: Provide Wi-Fi Coverage Inside Elevators", Wireless-Nets, Ltd, 2013, 2 pages.
Spindler, John, "A New Solution for Wireless Coverage in Elevators", Hospitalitynet, May 2, 2016, 7 pages.
Summer, Andrew Hall, "Cisco Wireless Equip Elevator Solution", Linkedin, Jan. 15, 2015, 5 pages.

ID SYSTEM

FOREIGN PRIORITY

This application claims priority to European Patent Application No. 18179571.7, filed Jun. 25, 2018, and all the benefits accruing therefrom under 35 U.S.C. § 119, the contents of which in its entirety are herein incorporated by reference.

BACKGROUND

The invention relates to a wireless communication in an elevator system, in particular to a method of providing a seamless wireless connection in the elevator system.

Wireless communication technologies using mobile devices have been widely spread all over the world and become essential in everyday lives. An elevator system, because of its structural characteristics, tends to shield the propagation of electromagnetic waveforms and thus elevator passengers have difficulties in enjoying a wireless connection while using elevators.

It is therefore desirable to provide a reliable wireless connectivity while a passenger is traveling in a building using an elevator.

BRIEF DESCRIPTION

According to an exemplary embodiment of the invention, a method of providing a wireless connection in an elevator system of a building comprises receiving an elevator car request from a passenger who is on a source floor, dispatching an elevator car to the source floor in response to the elevator car request, selecting at least one wireless local area network (WLAN) established in the building, and forwarding at least one WLAN via a network node placed in at least one of an elevator hall of the source floor, the dispatched elevator car, or an elevator hall of the destination floor.

Forwarding network traffic of individual WLANs in a building as suggested herein provides an elegant way for allowing a passenger of an elevator system to have seamless connectivity to a WLAN while using elevator service from placing an elevator car request until arrival at a destination floor. During the waiting time on the source floor and also during the travel time in the elevator car until arriving at the destination floor the passenger is able to stay connected to the same WLAN, for example a WLAN established on the source floor or a WLAN established on the destination floor. WLAN forwarding as suggested herein can be done by providing suitable network nodes (e.g. WLAN repeaters) in at least one of an elevator hall of the source floor, the dispatched elevator car, or an elevator hall of the destination floor. These network nodes are used for transmitting the forwarded WLAN or WLANs temporarily during the time the passenger is using elevator service. A particular advantage provided by the embodiments described herein is that limited bandwidth available for WLANs in a building can be used efficiently by selecting the forwarded WLAN or WLANs among available WLANs in a building. Furthermore, it is possible to configure the network nodes in the elevator hall of the source floor, in the dispatched elevator car, and/or in the elevator hall of the destination floor in such a way that knowledge of passwords or encryption schemes of the individual forwarded WLAN or WLANs is not required. Moreover, the amount of forwarded data communicated between the selected WLAN and a device of the passenger can be reduced by configuring the network nodes in the elevator hall of the source floor, in the dispatched elevator car, and/or in the elevator hall as so-called transparent agents. In this case, these network nodes do not act as standard WLAN network nodes or repeaters that forward all traffic from the respective WLAN in order to increase the range of the WLAN, but may be configured such that e.g. the network node on the source floor merely simulates the WLAN access point of the forwarded WLAN on the destination floor and an elevator control panel located on the destination floor simulates the mobile device of the passenger on the source floor. Therefore, only WLAN traffic related to the passenger's mobile device is forwarded using the network nodes in the elevator hall of the source floor, the dispatched elevator car, and/or the elevator hall of the destination floor. Particularly, software-defined networking (SDN) may be used to implement forwarding at least one WLAN via a network node placed in at least one of an elevator hall of the source floor, the dispatched elevator car, or an elevator hall of the destination floor. Software-defined networking facilitates network management and enables programmatically efficient network configuration by separating the mere forwarding of network packets in a so-called data plane, on the one hand, from the routing processes in a so-called control plane. The control plane consists of one or more controllers which are considered as the brain of SDN network where the whole intelligence is incorporated. While the control plane is decisive with respect to respective destinations where data is to be sent to, the data plane is merely responsible for directing respective data packages to the desired destinations. Software-defined networking allows implementing the control plane and the data plane as completely separate applications.

A number of optional features are set out in the following. These features may be realized in particular embodiments, alone or in combination with any of the other features.

The method may further comprise receiving information on a destination floor where the passenger desires to go. This information may be used to only select the forwarded WLAN or the forwarded WLANs among WLANs established on the source floor and/or WLANs established on the destination floor. In particular embodiments, at least one WLAN established on the source floor may be selected and forwarded via a network node placed in at least one of the elevator hall of the source floor, the dispatched elevator car or the elevator hall of the destination floor. Hence, connectivity to a WLAN established on the source floor will be preserved during a passenger's travel from the source floor to the destination floor. In further particular embodiments, at least one WLAN established on the destination floor may be selected and forwarded via a network node placed in at least one of the elevator hall of the source floor, the dispatched elevator car or the elevator hall of the destination floor. Hence, connectivity to a WLAN established on the destination floor will be already be provided while a passenger is waiting on the source floor and/or during the passenger's travel from the source floor to the destination floor.

In particular, the elevator car request may include information on a destination floor where the passenger desires to go. For example, the elevator request may be a destination call input by the passenger via a destination call panel located on the source floor, usually close to a landing door on the source floor, or input by the passenger via a mobile device. Information on a destination floor may also be obtained by identification of a passenger, e.g. from a database of residents in a building. Further, information on a destination floor may be obtained statistically, e.g. by assuming that around noontime all passengers prefer to go to the restaurant floor. By selecting at least one WLAN based on the information on the destination floor and forwarding the selected at least one WLAN, network resources of the building like bandwidth can be saved.

Forwarding the at least one WLAN may comprise forwarding the at least one WLAN via a first network node placed in the elevator hall of the source floor, detecting that the dispatched elevator car has arrived at the source floor and a door of the dispatched elevator car has opened, and forwarding the at least one WLAN via a second network node placed in the dispatched elevator car. Further, in particular, forwarding the at least one WLAN may comprise detecting that the dispatched elevator car has arrived at the destination floor and a door of the dispatched elevator car has opened, and forwarding the at least one WLAN via a first network node placed in the elevator hall on the destination floor.

Particularly, the method may further comprise detecting that the dispatched elevator car has arrived at the destination floor and the door of the dispatched elevator car has opened, and stopping forwarding the selected WLAN via the second network node. Particularly, forwarding the selected WLAN may be stopped after a predefined time.

The at least one WLAN established on the destination floor or on the source floor may comprise a plurality of WLANs, and the method may further comprise selecting one of the plurality of WLANs by detecting a communication between the passenger's mobile device and the one of the plurality of WLANs, and forwarding the selected WLAN. Particularly, the method may comprise stopping forwarding the other WLANs, once the one of the plurality of WLANs has been selected. This allows reducing required bandwidth, since only one of the plurality of WLANs established on the destination floor or the source floor has to be forwarded.

The concept of WLAN forwarding described herein can also be applied to elevator car requests involving dispatching of more than one elevator car to serve the elevator car request. A typical scenario is in a high rise building having a sky lobby at one of the higher level floors. The sky lobby is an intermediate interchange floor allowing passengers to transfer from an express elevator that stops only at one or several ground floors (lobby floors) and the sky lobby to a local elevator which stops at every floor within a segment of the building. When servicing an elevator car request from one of the lobby floors to a local floor (or from one of the local floors to one of the lobby floors), the elevator controller might dispatch two elevator cars for servicing the elevator car request. A first elevator car (express car) will transport the passenger from the lobby floor to the sky lobby floor (or from the sky lobby floor to the lobby floor), and a second elevator car (local car) will transport the passenger from the sky lobby floor to the local floor (or from the local floor to the sky lobby floor). In this embodiment, for example, upon receiving an elevator car request from a passenger who is on a lobby floor (source floor) and wants to go to a local floor (destination floor) via the sky lobby, the elevator controller may dispatch a first elevator car (express car) to the source floor and a second elevator car (local car) to the sky lobby. In another example, upon receiving an elevator car request from a passenger who is on a local floor (source floor) and wants to go to a lobby floor (destination floor) via the sky lobby, the elevator controller may dispatch a first elevator car (express car) to the sky lobby floor and a second elevator car (local car) to the local floor.

In such cases a WLAN distribution controller of the building may transfer at least one selected WLAN of the building to (i) the source floor via a first network node arranged in an elevator hall of the source floor, (ii) inside one of the first elevator car or the second elevator car via a second network node placed in the one of the first elevator car or the second elevator car, (iii) to the sky lobby via a first network node arranged in an elevator hall of the sky lobby, (iv) inside the other one of the first elevator car or the second elevator car via a second network node placed in the other one of the first elevator car or the second elevator car, and (v) to the destination floor via a first network node arranged in an elevator hall of the destination floor. This forwarding of the at least one selected WLAN may be carried in sequential order of phases (i) to (v), wherein it is of course possible that consecutive phases overlap to some extent, i.e. forwarding the WLAN to the current one of the said network nodes is effected only after forwarding the WLAN to the next network node in the sequence is established. It is possible to forward a selected WLAN from the source floor to the destination floor, but it also possible to forward a selected WLAN from the destination floor to the source floor in this way. The selected WLAN may be a WLAN established on the source floor or a WLAN established on the destination floor.

For example, when a passenger intends to leave the building from one of the local floors via the sky lobby and using an express car, at least one selected WLAN of the local floor (source floor) may be sequentially forwarded to the elevator hall on the local floor, inside the second elevator car (local car) traveling from the source floor to the sky lobby, to the sky lobby, inside the first elevator car (express car) traveling from the sky lobby to a ground floor (destination floor), and to the ground floor.

In another example, when a passenger enters a building on the ground floor (lobby floor) and intends to go one of the local floors via the sky lobby and using an express car, at least one selected WLAN of the local floor (destination floor) may be sequentially forwarded to the elevator hall on the ground floor (source floor), inside the first elevator car (express car) traveling from the ground floor to the sky lobby, to the sky lobby, inside the second elevator car (local car) traveling from the sky lobby to the local floor (destination floor), and to the destination floor.

Particularly, dispatching an elevator car in response to the elevator car request may comprise dispatching a first elevator car to travel between a lobby floor and a sky lobby floor and dispatching a second elevator car to travel between the sky lobby floor and a local floor, and the method may comprise: forwarding the at least one selected WLAN via a first network node placed in the elevator hall of the source floor; detecting that one of the dispatched first or second elevator car has arrived at the source floor and a door of the one of the dispatched first or second elevator car has opened; forwarding the at least one selected WLAN via a second network node placed in the one of the dispatched first or second elevator car; detecting that the one of the dispatched first or second elevator car has arrived at the sky lobby floor and the door of the one of the dispatched first or second elevator car has opened; forwarding the at least one selected WLAN via a first network node placed in an elevator hall of the sky lobby; detecting that the other one of the dispatched first or second elevator car has arrived at the sky lobby and a door of the other one of the dispatched first or second elevator car has opened; and forwarding the at least one selected WLAN via a second network node placed in the other one of the dispatched first or second elevator car.

In particular, the at least one WLAN may be a wireless fidelity (WiFi) network. Moreover, the first and second network nodes may be repeaters or access points (APs).

According to an exemplary embodiment of the invention, an elevator system to be used in a building may comprise at least one elevator car, a network node placed in at least one of an elevator hall or an elevator car, and an elevator controller which is configured to receive an elevator car request from a passenger who is on a source floor, dispatch one of the at least one elevator car to the source floor in response to the elevator car request, select at least one wireless local area network (WLAN) established in the building; and forward the at least one WLAN via the network node.

Such system will provide the same characteristics and advantages as outlined with respect to the method above. Particularly, the controller may be further configured to receive information on a destination floor where the passenger desires to go. In particular embodiments, at least one WLAN established on the source floor may be selected and forwarded via a network node placed in at least one of the elevator hall of the source floor, the dispatched elevator car or the elevator hall of the destination floor. In further particular embodiments, at least one WLAN established on the destination floor may be selected and forwarded via a network node placed in at least one of the elevator hall of the source floor, the dispatched elevator car or the elevator hall of the destination floor. In particular, the elevator car request may include information on a destination floor where the passenger desires to go.

The network node may comprise a first network node placed in an elevator hall, particularly in an elevator hall of the source floor, in an elevator hall of the destination floor, and/or in an elevator hall of a sky lobby floor, if present. The network node further may comprise a second network node placed in the elevator car. Particularly, the network node may comprise respective second network nodes in any of a plurality of elevator cars dispatched to serve an elevator car request. In particular, the elevator controller may be further configured to forward the at least one WLAN via the first network node, detect that the dispatched elevator car has arrived at the source floor and a door of the dispatched elevator car has opened, and forward the at least one WLAN via the second network node. Further, in particular, the elevator controller may be configured to detect that the dispatched elevator car has arrived at the destination floor and a door of the dispatched elevator car has opened, and forward the at least one WLAN via the first network node placed in the elevator hall of the destination floor.

The elevator controller may be further configured to detect that the dispatched elevator car has arrived at the destination floor and the door of the dispatched elevator car has opened and stop forwarding the selected WLAN via the second network node Particularly, the at least one WLAN established on the destination floor or the source floor may comprise a plurality of WLANs, and the elevator controller may be further configured to select one of the plurality of WLANs by detecting a communication between the passenger's mobile device and the one of the plurality of WLANs, and forward the selected WLAN. Particularly, the method may comprise stopping forwarding the other WLANs, once the one of the plurality of WLANs has been selected. This allows reducing required bandwidth, since only one of the plurality of WLANs established on the destination floor or the source floor has to be forwarded.

The elevator controller may be configured to dispatch an elevator car in response to the elevator car request by dispatching a first elevator car to travel between a lobby floor and a sky lobby floor and dispatching a second elevator car to travel between the sky lobby floor and a local floor. The elevator controller further may be configured to: forward the at least one selected WLAN via a first network node placed in the elevator hall of the source floor; detect that one of the dispatched first or second elevator car has arrived at the source floor and a door of the one of the dispatched first or second elevator car has opened; forward the at least one selected WLAN via a second network node placed in the one of the dispatched first or second elevator car; detect that the one of the dispatched first or second elevator car has arrived at the sky lobby floor and the door of the one of the dispatched first or second elevator car has opened; forward the at least one selected WLAN via a first network node placed in an elevator hall of the sky lobby; detect that the other one of the dispatched first or second elevator car has arrived at the sky lobby and a door of the other one of the dispatched first or second elevator car has opened; and forward the at least one selected WLAN via a second network node placed in the other one of the dispatched first or second elevator car.

Embodiments of the present invention described herein provide a reliable wireless connectivity while a passenger is traveling in a building using an elevator. Particularly, the wireless connectivity is seamless, i.e. the passenger does not experience any disruption of the connectivity when entering or leaving the elevator car.

DRAWING DESCRIPTION

In the following an exemplary embodiment of the invention is described with reference to the enclosed figures.

DETAILED DESCRIPTION

Figure 1:
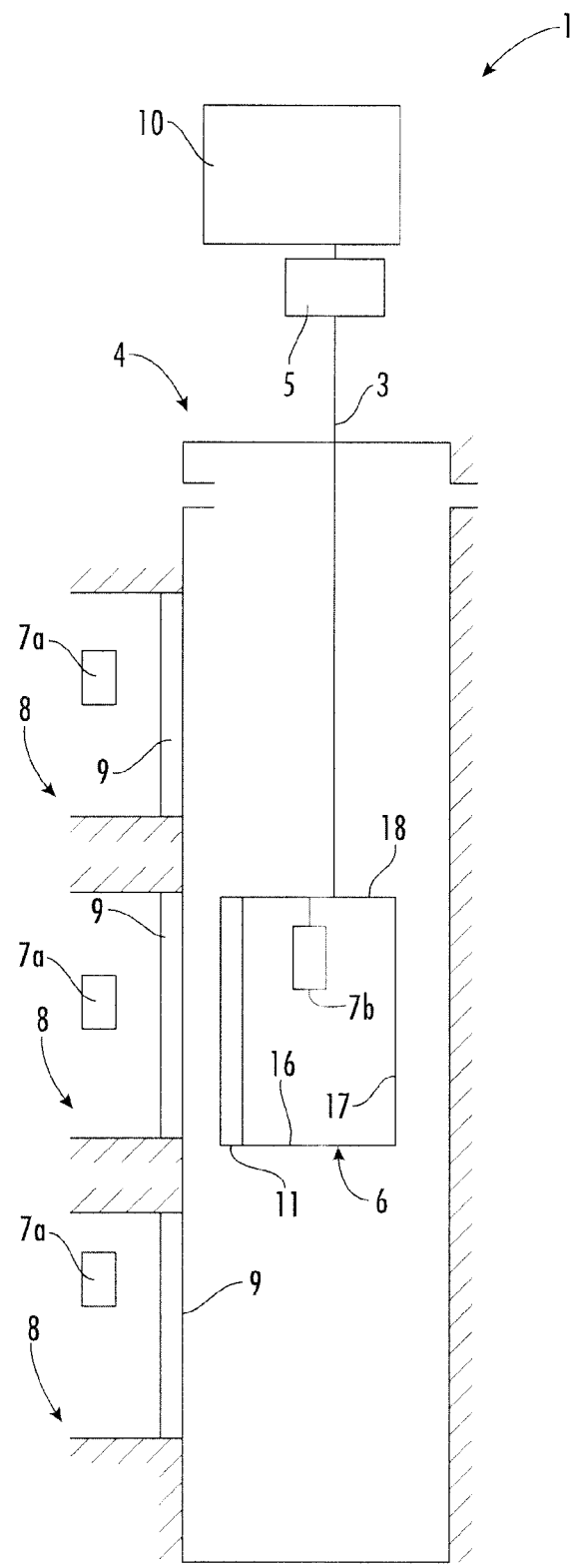
FIG. 1 is a schematic diagram depicting an elevator system comprising an elevator car according to an exemplary embodiment of the invention.

FIG. 1 schematically depicts an elevator system 1 based upon which an exemplary embodiment of the invention can be implemented. The elevator system 1 comprises an elevator car 6.

The elevator system 1 further comprises a hoistway 4 extending in a vertical direction between a plurality of landings 8 located on different floors.

The elevator car 6 comprises a car floor 16, a car ceiling 18 and car sidewalls 17 extending between the car floor 16 and the car ceiling 18 defining an interior space of the elevator car 6. Only one car sidewall 17 is depicted in the schematic illustration of FIG. 1.

Each landing 8 is provided with a landing door (elevator hoistway door) 9, and the elevator car 6 is provided with a corresponding elevator car door 11 allowing passengers to transfer between a landing 8 and the interior space of the elevator car 6 when the elevator car 6 is positioned at the respective landing 8.

The elevator car 6 is movably suspended within the hoistway 4 by means of a tension member 3. The tension member 3, for example a rope or belt, is connected to a drive 5, which is configured for driving the tension member 3 in order to move the elevator car 6 along the longitudinal direction/height of the hoistway 4 between the plurality of landings 8.

The elevator system 1 shown in FIG. 1 uses a 1:1 roping for suspending the elevator car 6. The skilled person, however, easily understands that the type of the roping is not essential for the invention and that different kinds of roping, e.g. a 2:1 roping or a 4:1 roping may be used as well.

The elevator system 1 may further include a counterweight (not shown) attached to the tension member 3 opposite to the elevator car 6 and moving concurrently and in opposite direction with respect to the elevator car 6 along at least one counterweight guide member (not shown). The skilled person will understand that the invention may be applied to elevator systems 1 which do not comprise a counterweight as well.

The tension member 3 may be a rope, e.g. a steel core, or a belt. The tension member 3 may be uncoated or may have a coating, e.g. in the form of a polymer jacket. In a particular embodiment, the tension member 3 may be a belt comprising a plurality of polymer coated steel cords (not shown). The elevator system 1 may have a traction drive including a traction sheave for driving the tension member 3. Instead of a traction drive, a hydraulic or a linear drive may be used for driving the tension member 3. In an alternative configuration, which is not shown in the figures, the elevator system 1 may be an elevator system 1 without a tension member 3, comprising e.g. a hydraulic drive or a linear drive. The elevator system 1 may have a machine room (not shown) or may be a machine room-less elevator system.

The drive 5 is controlled by an elevator control 10 for moving the elevator car 6 along the hoistway 4 between the different landings 8.

Input to the elevator control 10 may be provided via elevator hall call buttons included in hall call panels 7a, which are provided on each landing 8 close to the elevator landing doors 9, and/or via elevator car control buttons provided in a car control panel 7b located inside the elevator car 6. The hall call panels 7a may have the configuration of destination call panels including buttons for input of a desired destination floor by the passenger. In this case, the elevator car control buttons 7b inside the elevator car 6 are not required to have elevator car control buttons for input of the desired destination floor.

The wireless communication described herein may also be applied in a modified way to elevator systems having traditional up/down call buttons. In this case, an elevator car request will include a hall call and the corresponding car call input by the passenger after the dispatched elevator car has arrived at the passenger's source floor.

The wireless communication described herein is particularly well suited for elevator systems in which elevator car calls can be made using mobile devices equipped with particular software for communicating with the elevator system and in which input of elevator car calls can be made via user interfaces of the mobile devices.

The elevator hall call panels 7a and the elevator car control buttons 7b may be connected to the elevator control 15 by means of electrical lines, which are not shown in FIG. 1, in particular by an electric bus, e.g. a field bus such as a CAN bus, or by means of wireless data transmission.

Figure 2:
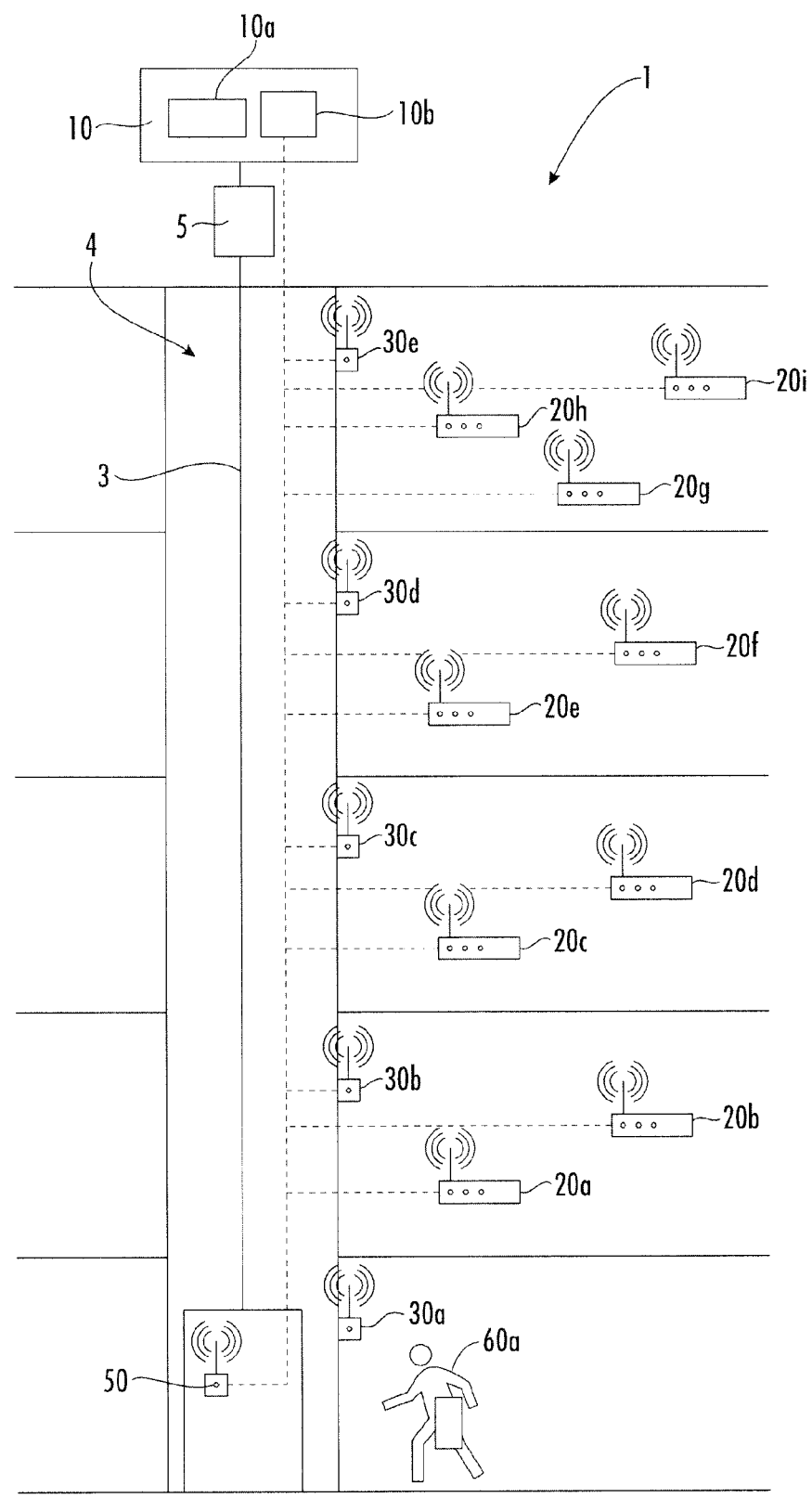
FIG. 2 is a schematic diagram showing an overall network structure in accordance with an embodiment of the present invention.

FIG. 2 is a schematic diagram depicting an elevator system 1 according to an exemplary embodiment of the invention.

The elevator system 1 shown in FIG. 2 basically corresponds to the elevator system 1 of FIG. 1. The exemplary embodiment of the elevator system in FIG. 2 is further provided with a first repeater 30a, 30b, 30c, 30d, 30e arranged in an elevator hall of each floor and a second repeater 50 arranged inside the elevator car 6. The elevator control 10 according to the exemplary embodiment of the elevator system 1 comprises a dispatcher 10a and a WLAN distribution controller 10b. The dispatcher 10a is configured to dispatch an elevator car 6 of the elevator system 1 to a source floor in response to a passenger's elevator car request based on a predefined algorithm. The WLAN distribution controller 10b is configured to transfer a WLAN set up on a certain floor to another floor or into the elevator car by, for example, interconnecting an access point (AP) of the WLAN with the first repeater 30a-30e or the second repeater 50.

FIG. 2 shows a plurality of APs 20a-20i providing services in corresponding WLANs established by residents on the second to fifth floors. In the embodiment of FIG. 2, WiFi networks are used as examples of the WLANs. It is, however, to be noted that an example of WLAN is not limited to WiFi and that the subject-matter of the invention can also be implemented with other types of WLANs. Hereinafter, the WiFi networks may also be referenced as "20a-20i" as necessary.

WiFi, which is a trademark of the WiFi Alliance, is a representative WLAN technology based on IEEE 802.11 technical standards. The IEEE 802.11 standard is a set of media access control (MAC) and physical layer (PHY) specifications for implementing WLANs in the 2.4, 3.6, 5, and 60 GHz frequency bands. A WiFi which is deployed in an infrastructure mode comprises an AP and at least one client node (i.e. mobile device). The AP and a client node communicate with each other by exchanging various types of PHY/MAC frames defined by the IEEE 802.11 standards.

Further, in FIG. 2, the WLAN distribution controller 10b of the elevator control 10 is connected with the first repeaters 30a-30e, the second repeater 50, and the APs 20a-20i of the WiFi networks on the second to fifth floors. The connection between the WLAN distribution controller 10b and the first repeaters 30a-30e, the second repeater 50, and/or the APs 20a-20i is preferably wired, but they may be wirelessly connected. Although named "repeater" in this document, the first or second repeaters may be other types of network nodes such as access points (APs), bridges, routers, and relays etc.

Figure 3:
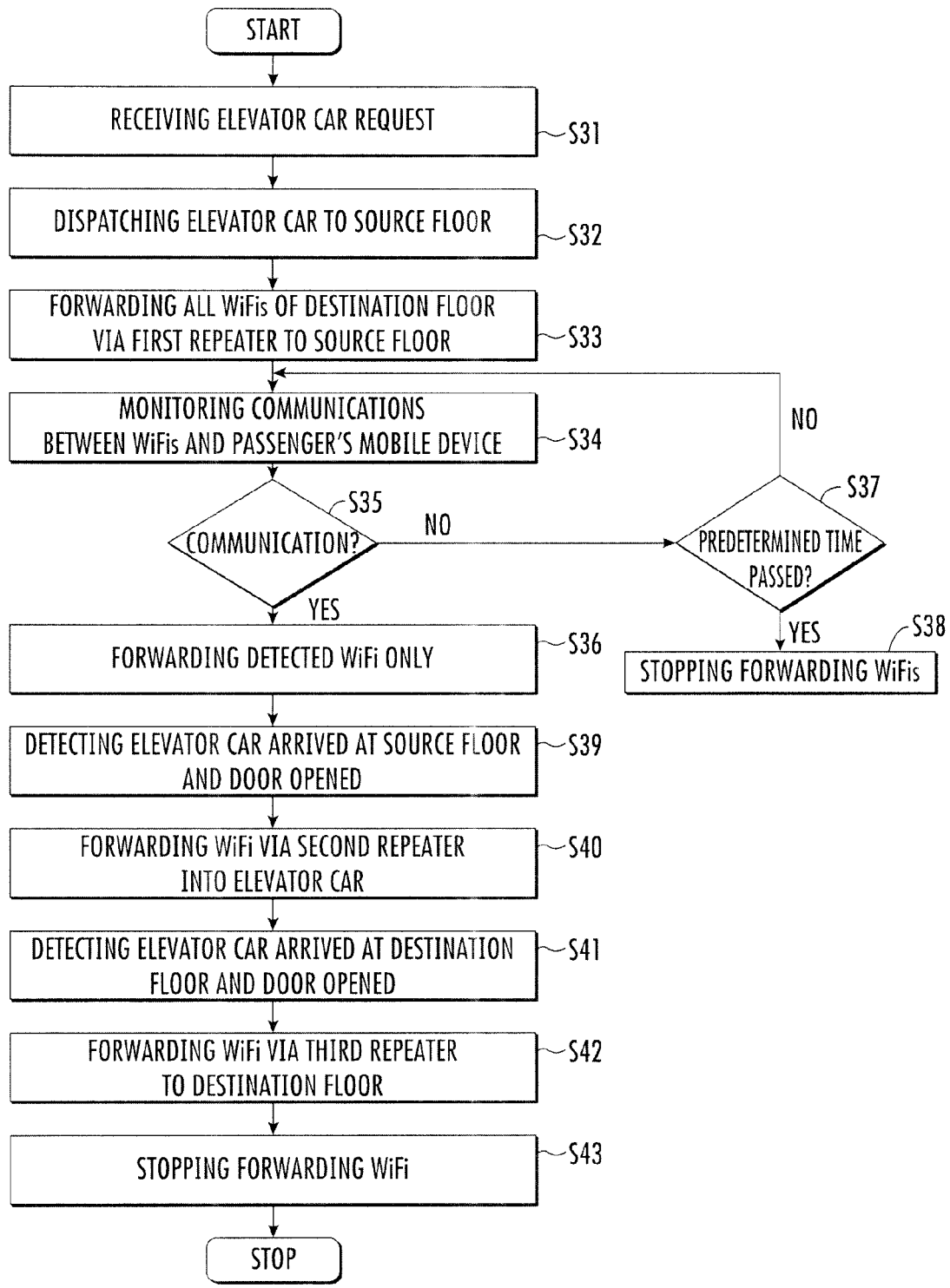
FIG. 3 is a diagram showing an exemplary structure of a first communication unit in accordance with an embodiment of the present invention.

FIG. 3 is a flowchart showing a process for providing a seamless wireless connection in an elevator system 1 in accordance with an exemplary embodiment of the invention. In FIG. 3, it is assumed that a passenger 60a is a resident living in a first apartment on the fifth floor and that a WiFi 20h has been set up in the first apartment.

Referring to FIGS. 1-3, when a passenger 60a who is on a source floor, e.g. the first floor in FIG. 2, selects his or her destination floor by pushing or touching a corresponding button contained in the elevator hall call panel 7a or on a mobile device carried by the passenger 60a, at S31, the elevator control 10 receives an elevator car request (elevator car call) which includes information on the selected destination floor, e.g. the fifth floor in FIG. 2. At S32, the dispatcher 10a of the elevator control 10 selects one of the elevator cars available based on a predefined elevator car distribution algorithm and then dispatches the selected elevator car to the source floor in response to the passenger's elevator request.

At S33, the WLAN distribution controller 10b of the elevator control 10 forwards all WiFi networks 20h, 20g, and 20i established on the fifth floor which is the destination floor to the first floor which is the source floor using the first repeater 30a. The order of the steps S32 and S33 in FIG. 3 may be changed or they may happen simultaneously.

In this document, "forwarding a WLAN or a WiFi network" means enabling a passenger of an elevator system to use his/her own WLAN or WiFi set up in his/her house or office on a different floor or in an elevator car using various known technologies, e.g. extending a coverage of the WLAN or Wifi by using a repeater placed in an elevator hall of the different floor or in the elevator car or by interconnecting an AP of the WLAN or WiFi with another AP located on the different floor or in the elevator car. Other networks nodes like a router, bridge, or a relay may be placed on the different floor or in the elevator car to "forward the WLAN or WiFi". Further, forwarding a plurality of WLANs or WiFis is possible by enabling network resources of the repeater or the network node arranged on the different floor or in the elevator car to be shared by the plurality of WLANs or WiFis. An example of the network resources is time or a frequency band allocated for the WLAN or WiFi.

An example of known technologies to extend coverage of the WLAN or WiFi is a wireless distribution system (WDS) protocol. The WDS is a system enabling a wireless interconnection of access points (APs) in WiFi networks and it allows a wireless network to be expanded using multiple APs. Moreover, software-defined networking (SDN) may be used to implement forwarding at least one WLAN via a network node placed in at least one of an elevator hall of the source floor, the dispatched elevator car, or an elevator hall of the destination floor.

Referring to FIG. 3 again, at S34, the WLAN distribution controller 10b monitors if a mobile device of the passenger 60a performs a communication with any of the APs of the forwarded WiFis 20h, 20g, and 20i. In order to be associated with a WiFi, a mobile device is supposed to exchange a plurality of messages defined by the 802.11 technical standards with an AP of the WiFi. For example, in order to establish a physical synchronization with the AP, the mobile device has to detect and decode a beacon periodically broadcast by the AP during a scanning procedure. After the synchronization is established, an authentication procedure and an association procedure are sequentially performed. For the authentication procedure, a couple of messages like an authentication request message, a challenge phrase message, and an encrypted challenge phrase message are exchanged between the mobile device and the AP. Further, for the association procedure, an association request message and an association response message are exchanged between them. At S34, the WLAN distribution controller 10b monitors if these messages are exchanged between the passenger's mobile device and any of the APs 20g, 20h, and 20i.

At S35, when a communication between the mobile device and any of the APs 20h, 20g, 20i is detected, the WLAN distribution controller 10b forwards the detected WiFi only (i.e. 20h) via the first repeater 30a and stops forwarding the other WiFis 20g and 20i at S36. On the other hand, at S37 and S38, if the WLAN distribution controller 10b fails to detect a communication between the mobile device and any of the forwarded WiFis 20g, 20h, 20i for a predetermined time, the WLAN distribution controller 10b stops forwarding all of the WiFis 20h, 20g, 20i. No communication between the mobile device and the WiFis 20g, 20h, 20i for the predetermined time may imply that the passenger has no intention to use a wireless service via his or her WiFi. The predetermined time may be selected to be a value in between 10 seconds and one minute.

Upon detecting that the elevator car 6 has arrived at the source floor and a door of the elevator car 6 has opened at S39, the WLAN distribution controller 10b forwards the WiFi 20h which is communicating with the mobile device into the elevator car 6 via the second repeater 50 at S40.

At S41, the elevator control 10 detects the elevator car 6 has arrived at the destination floor and the door of the elevator car 6 has opened and thereafter, at S42, the WLAN distribution controller 10b forwards the WiFi 20h to the destination floor via the first repeater 30e located in the elevator hall of the destination floor. After a predetermined time has elapsed right after the door of the elevator car 6 has opened, at S43, the WLAN distribution controller 10b stops forwarding the WiFi 20h via the second repeater 50.

Figure 4:
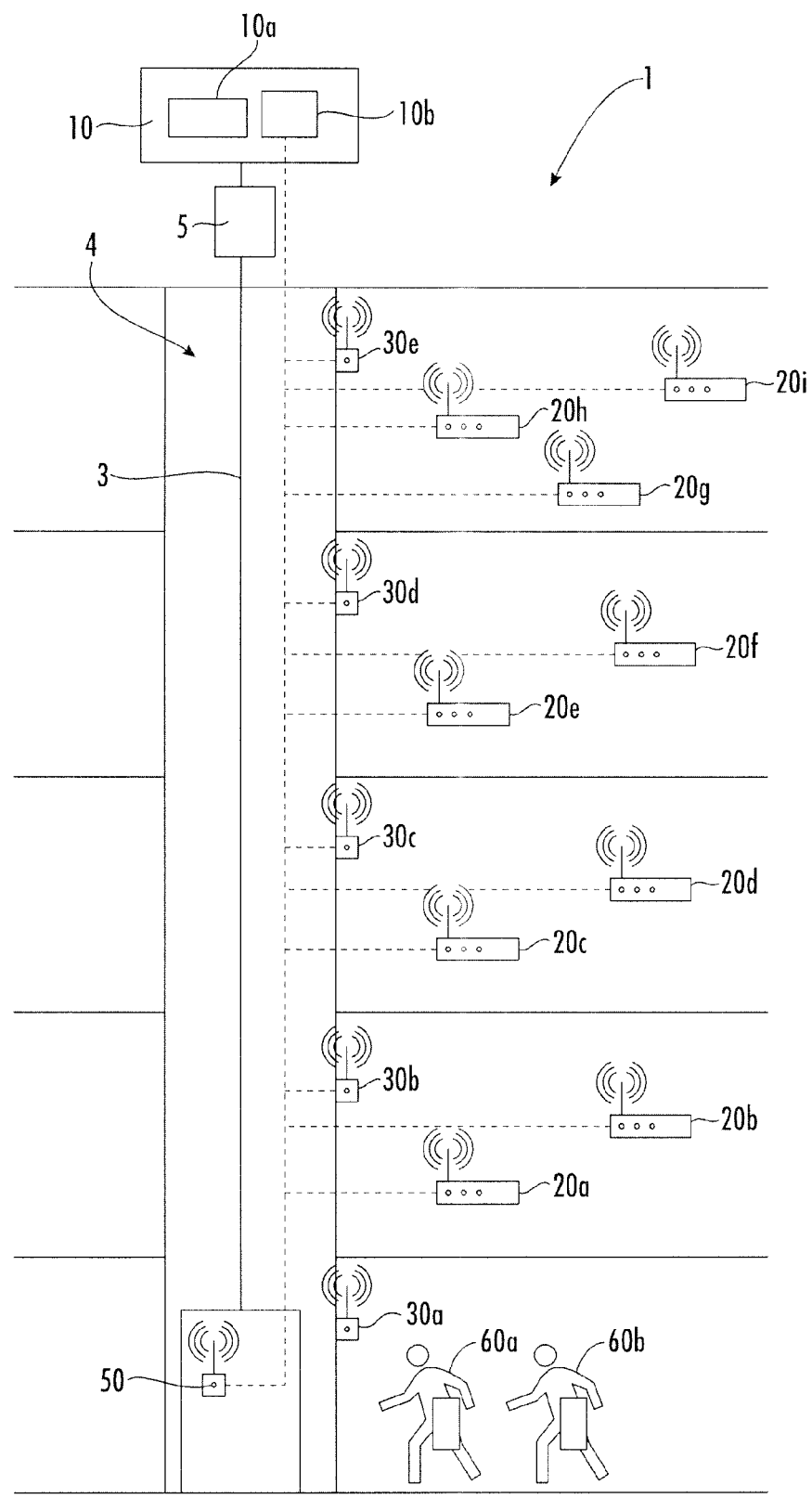
FIG. 4 is a schematic diagram depicting an elevator system according to another exemplary embodiment of the invention.

FIG. 4 is a schematic diagram depicting an elevator system 1 according to another exemplary embodiment of the invention.

The example of FIG. 4 is a case where a plurality of passengers 60a, 60b are using the same elevator car 6. In FIG. 4, it is assumed that a first passenger 60a is a resident living in a first apartment on the fifth floor and a second passenger 60b is living in a second apartment on the third floor. It is also assumed that a first WiFi 20h has been set up in the first apartment and a second WiFi 20c has been set up in the second apartment.

An overall process in the example of FIG. 4 is similar to that of FIG. 2, so that repetitions of the same explanations will be skipped. When the first and second passengers 60a, 60b select their destination floors one by one through the hall call panels 7a, i.e. the fifth floor and the third floor, respectively, the WLAN distribution controller 10b of the elevator control 10 transfers all WiFis 20g, 20h, and 20i of the fifth floor and all WiFis 20c and 20d of the third floor to the source floor via the first repeater 30a located in the elevator hall of the source floor. Upon detecting communications between the first passenger's mobile device and the AP 20h, and between the second passenger's mobile device and the AP 20c, the WLAN distribution controller 10b keeps transferring the WiFis 20h and 20c and stops transferring the other WiFis 20g, 20i, and 20b. When detecting that the elevator car 6 has arrived at the source floor and a door of the elevator car 6 has opened, the WLAN distribution controller 10b transfers the WiFis 20h and 20c into the elevator car 6 via the second repeater 50. Upon detecting the elevator car 6 has arrived at the third and fifth floors sequentially and the door of the elevator car 6 has opened, the WLAN distribution controller 10b transfers the WiFis 20h and 20c to the third floor and fifth floor via the first repeater 30c located in the elevator hall of the third floor and the first repeater located in the elevator hall of the fifth floor 30e, respectively.

In the embodiment of FIG. 4, quality of service (QoS) for each passenger may be controlled. For example, a different level of QoS can be provided for the first passenger 60a and the second passenger 60b by allocating different amounts of communication resources like time or frequency to them depending on, e.g. their registered payment plans.

Figure 5:
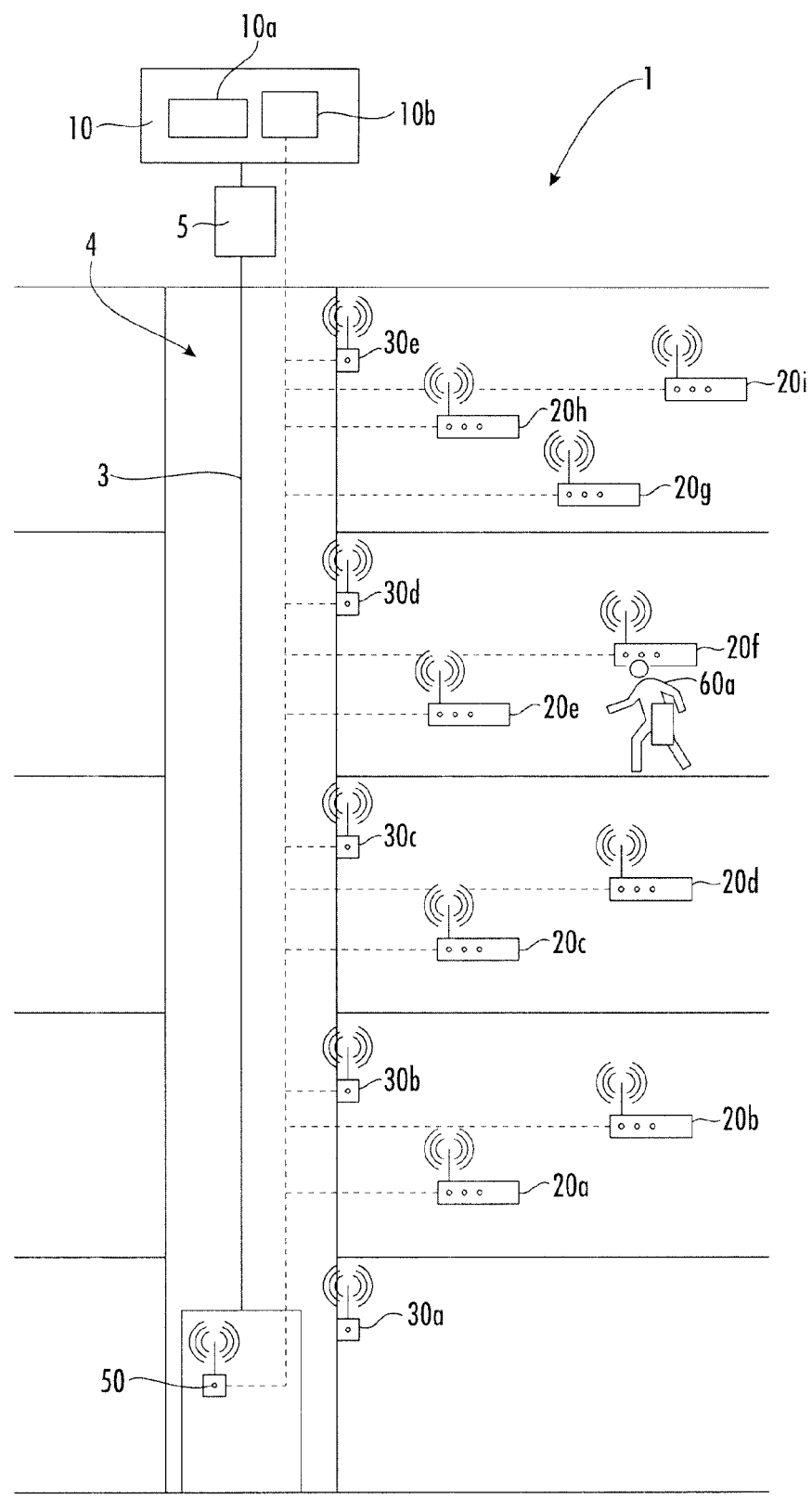
FIG. 5 is a schematic diagram depicting an elevator system according to another exemplary embodiment of the invention.

FIG. 5 is a schematic diagram depicting an elevator system 1 according to a further exemplary embodiment of the invention. The embodiment of FIG. 5 is a case where a passenger 60a is leaving his or her home located on the fourth floor using the elevator system 1. In this example, a source floor is the fourth floor and a destination floor is the first floor.

Referring to FIG. 5, upon receiving an elevator car request from the passenger 60a through a hall call panel or the passenger's mobile device, the dispatcher 10a of the elevator control 10 dispatches the elevator car 6 to the source floor, i.e. the fourth floor and the WLAN distribution controller 10b transfers WiFis 20e, 20f of the source floor via the first repeater 30a arranged in the elevator hall of the source floor, the second repeater 50 arranged in the dispatched elevator car 6, and the first repeater 30a arranged in the elevator hall of the destination floor. The elevator car request may include information on the destination floor. Alternatively, it may also be possible for the elevator car request and the information on the destination floor to be sent to the elevator control 10 separately. For example, when the hall call panel 7a in the elevator hall only allows calling the elevator car, entering the destination floor can be done inside the elevator car 6 through the car control panel 7b. The procedures of S34-S43 in FIG. 3 can be analogously applied to the embodiment of FIG. 5.

As described above, the embodiments of the present invention can also be implemented in elevator systems in which elevator car requests can be made via passengers' mobile devices equipped with particular software for communicating with the elevator systems. In this case, an input of the elevator car request can be made via a user interface of the mobile device and the elevator car request may include identification information of the passenger and/or his or her home. Based on this information, it may also be possible for the WLAN distribution controller 10b of the elevator control 10 to transfer a WiFi established in the passenger's home or office via a network node placed in an elevator hall of a source floor, a dispatched elevator car, and an elevator hall of a destination floor. Such information may also be transferred to the elevator system through a hall call panel arranged in the elevator hall of the source floor or a car control panel placed in the elevator car. With this embodiment, the network resources of the building can be even more saved.

In the embodiments described above, the WLAN distribution controller 10b is a part of the elevator controller 10. Yet, it is also possible to make the WLAN distribution controller 10b as a separate physical or logical entity which is connected to the elevator controller 10. This connection may be wired or wireless.

According to the embodiments of the present invention, an elevator control which is informed of a destination floor from an elevator car request by a passenger is able to transfer WLANs of the destination floor and/or the source floor to a at least one of a source floor, inside an elevator car, or a destination floor, so that the passenger of an elevator can enjoy a seamless wireless connection using his or her own WLAN while he or she is waiting for the elevator on a different floor or even inside the elevator.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES 1 elevator system
3 tension member
4 hoistway
5 drive
6 elevator car
7a hall call panel
7b car control panel
8 landing
9 landing door frame
10 elevator control
10a dispatcher
10b WLAN distribution controller
11 elevator car door
16 floor of the elevator car
17 sidewall of the elevator car
18 ceiling of the elevator car
20a-20i WiFis or APs
30a-30e first network node (first repeater)
50 second network node (second repeater)
60a, 60b passengers

What is claimed is:

1. A method of providing a wireless connection in an elevator system (1) of a building, the method comprising:
receiving (S31) an elevator car request from a passenger who is on a source floor;
dispatching (S32) an elevator car (6) to the source floor in response to the elevator car request;
selecting at least one wireless local area network (WLAN) established in the building; and
forwarding (S33, S36, S40) the at least one WLAN via a network node placed in at least one of an elevator hall of the source floor, the dispatched elevator car (6), or an elevator hall of a destination floor;
wherein forwarding (S33, S36, S40) the at least one WLAN to the network node comprises extending a coverage of the at least one WLAN via the network node such that the passenger can access the at least one WLAN through the network node.

2. The method of claim 1, the method further comprising:
receiving (S31) information on a destination floor where the passenger desires to go, wherein at least one WLAN established on the source floor is selected and forwarded via a network node placed in at least one of the elevator hall of the source floor, the dispatched elevator car (6) or the elevator hall of the destination floor.

3. The method of claim 2, wherein the at least one WLAN established on the destination floor or the at least one WLAN established on the source floor comprises a plurality of WLANs (20a-20i), and the method further comprises:
selecting one of the plurality of WLANs (20a-20i) by detecting (S35) a communication between the passenger's mobile device and one of the plurality of WLANs (20a-20i); and
forwarding (S36) the selected WLAN.

4. The method of claim 1, the method further comprising:
receiving (S31) information on a destination floor where the passenger desires to go, wherein at least one WLAN established on the destination floor is selected and forwarded via a network node placed in at least one of the elevator hall of the source floor, the dispatched elevator car (6), or the elevator hall of the destination floor.

5. The method of claim 1,
wherein the elevator car request includes information on the destination floor where the passenger desires to go.

6. The method of claim 1, wherein forwarding the at least one WLAN comprises:
forwarding (S33) the at least one WLAN via a first network node placed in the elevator hall of the source floor;
detecting (S39) that the dispatched elevator car (6) has arrived at the source floor and a door of the dispatched elevator car (6) has opened; and
forwarding (S40) the at least one WLAN via a second network node placed in the dispatched elevator car; and particularly further comprises:
detecting (S41) that the dispatched elevator car (6) has arrived at the destination floor and the door of the dispatched elevator car has opened; and
stopping (S43) forwarding the WLAN via the second network node placed in the dispatched elevator car, particularly after a predefined time has lapsed.

7. The method of claim 1, wherein dispatching an elevator car in response to the elevator car request comprises dispatching a first elevator car to travel between a lobby floor and a sky lobby floor and dispatching a second elevator car to travel between the sky lobby floor and a local floor; the method comprising:
forwarding the at least one selected WLAN via a first network node placed in the elevator hall of the source floor;
detecting that one of the dispatched first or second elevator car has arrived at the source floor and a door of the one of the dispatched first or second elevator car has opened;
forwarding the at least one selected WLAN via a second network node placed in the one of the dispatched first or second elevator car;
detecting that the one of the dispatched first or second elevator car has arrived at the sky lobby floor and the door of the one of the dispatched first or second elevator car has opened;
forwarding the at least one selected WLAN via a first network node placed in an elevator hall of the sky lobby;
detecting that the other one of the dispatched first or second elevator car has arrived at the sky lobby and a door of the other one of the dispatched first or second elevator car has opened; and
forwarding the at least one selected WLAN via a second network node placed in the other one of the dispatched first or second elevator car.

8. An elevator system (1) to be used in a building, the system (1) comprising:
at least one elevator car (6):
a network node (30a-30e, 50) placed in at least one of an elevator hall or an elevator car (6); and
an elevator controller (10) configured to:
receive an elevator car request from a passenger who is on a source floor;
dispatch an elevator car (6) to the source floor in response to the elevator car request;
select at least one wireless local area network (WLAN) established in the building; and
forward the at least one WLAN via a network node placed in at least one of an elevator hall of the source floor, the dispatched elevator car (6), or an elevator hall of a destination floor;
wherein forwarding (S33, S36, S40) the at least one WLAN to the network node comprises extending a coverage of the at least one WLAN via the network node such that the passenger can access the at least one WLAN through the network node.

9. The elevator system of claim 8, wherein the controller (10) is further configured to:
receive information on a destination floor where the passenger desires to go, wherein at least one WLAN established on the source floor is selected and forwarded via a network node placed in at least one of the elevator hall of the source floor, the dispatched elevator car (6) or the elevator hall of the destination floor.

10. The elevator system of claim 8, wherein the controller (10) is further configured to:
receive information on a destination floor where the passenger desires to go, wherein at least one WLAN established on the destination floor is selected and forwarded via a network node placed in at least one of the elevator hall of the source floor, the dispatched elevator car (6), or the elevator hall of the destination floor.

11. The elevator system of claim 8, wherein the elevator car request includes information on a destination floor where the passenger (60a, 60b) desires to go.

12. The system of claim 8, wherein the network node (30a-30e, 50) comprises:
a first network node (30a-30e) placed in the elevator hall of the source floor; and
a second network node (50) placed in the dispatched elevator car (6).

13. The system of claim 12, wherein the elevator controller (10) is configured to:
forward the at least one WLAN via the first network node (30a-30e);
detect that the dispatched elevator car (6) has arrived at the source floor and a door of the dispatched elevator car (6) has opened; and
forward the at least one WLAN via the second network node (50);
wherein the elevator controller (10) is particularly further configured to:
detect that the dispatched elevator car (6) has arrived at the destination floor and the door of the dispatched elevator car (6) has opened; and
stop forwarding the WLAN via the second network node (50), particularly after a predefined time has lapsed.

14. The system of claim 8, wherein the at least one WLAN established on the destination floor or the at least WLAN established on the source floor comprises a plurality of WLANs (20a-20i), and the elevator controller (10) is further configured to:
select one of the plurality of WLANs (20a-20i) by detecting a communication between the passenger's mobile device and the one of the plurality of WLANs (20a-20i); and
forward the selected WLAN.

15. The system of claim 8, wherein the elevator controller (10) is further configured to dispatch an elevator car in response to the elevator car request by dispatching a first elevator car to travel between a lobby floor and a sky lobby floor and dispatching a second elevator car to travel between the sky lobby floor and a local floor; wherein the elevator controller further is configured to:
forward the at least one selected WLAN via a first network node placed in the elevator hall of the source floor, detect that one of the dispatched first or second elevator car has arrived at the source floor and a door of the one of the dispatched first or second elevator car has opened;

forward the at least one selected WLAN via a second network node placed in the one of the dispatched first or second elevator car;

detect that the one of the dispatched first or second elevator car has arrived at the sky lobby floor and the door of the one of the dispatched first or second elevator car has opened;

forward the at least one selected WLAN via a first network node placed in an elevator hall of the sky lobby;

detect that the other one of the dispatched first or second elevator car has arrived at the sky lobby and a door of the other one of the dispatched first or second elevator car has opened; and forward the at least one selected WLAN via a second network node placed in the other one of the dispatched first or second elevator car.

\* \* \* \* \*